(12) United States Patent
Puotkalis

(10) Patent No.: US 12,018,751 B2
(45) Date of Patent: Jun. 25, 2024

(54) GEAR SHIFT DRUM

(71) Applicant: Doubleeagle Industry (China) Limited, Hongkong (CN)

(72) Inventor: Martin Puotkalis, Vilnius (LT)

(73) Assignee: Doubleeagle Industry (China) Limited, Hongkong (CN)

( * ) Notice: Subject to any disclaimer, the term of this patent is extended or adjusted under 35 U.S.C. 154(b) by 0 days.

(21) Appl. No.: 17/981,137

(22) Filed: Nov. 4, 2022

(65) Prior Publication Data

US 2023/0141361 A1     May 11, 2023

(30) Foreign Application Priority Data

Nov. 5, 2021   (DE) ................. 10 2021 128 917 U

(51) Int. Cl.
  *F16H 63/32*   (2006.01)
  *F16H 63/10*   (2006.01)

(52) U.S. Cl.
  CPC ............ *F16H 63/10* (2013.01); *F16H 63/32* (2013.01)

(58) Field of Classification Search
  CPC ..... F16H 63/32; F16H 63/10; F16H 2025/204

USPC ........................................................ 74/89.33
See application file for complete search history.

(56) References Cited

U.S. PATENT DOCUMENTS 6,370,976 B1 * 4/2002 Doppling ................ F16H 63/18
                                              74/337.5

FOREIGN PATENT DOCUMENTS

WO     WO-9105964 A1 * 10/1990

* cited by examiner

*Primary Examiner* — Randell J Krug

(57) ABSTRACT

A device (10) for axially moving a gearbox element (12), including: a shift drum (50) mounted rotatably about an axis of rotation (8) and having a shifting groove (62) formed in its outer casing at least partially circumferentially about the axis of rotation (8), which groove is axially inclinded (64) at least in some areas, a cage (30) holding the gear shift drum (50) with a cage wall (34) delimiting an inner cage space (48) against an outer cage space and a wall slot (70) extending axially through the cage wall (34) and opening the inner cage space (48) towards the outer cage space, a carriage (42) held axially movably between the gear shift drum (50) and the cage wall (34) in the area of the wall slot (70), and a shift fork (46) with two fork legs (80).

12 Claims, 4 Drawing Sheets

GEAR SHIFT DRUM

This application claims priority from the German patent application 10 2021 128 917.3 filed Nov. 5, 2021, the content of which is incorporated herein in the entirety by reference.

TECHNICAL FIELD

The present invention relates to a device for axially moving a gearbox element according to the preamble of the valid claim 1.

BACKGROUND

DE 89 12 348 U1, U.S. Pat. No. 4,782,782 A and DE 689 10 468 T2 each disclose a device according to the preamble of the current claim 1. A device of this type is also known from U.S. Pat. No. 6,370,976 B1.

It is object of the invention to improve the known device.

The task is fulfilled by the characteristics of the independent claims. Preferred embodiments are the subject matter of the dependent claims.

SUMMARY

According to one aspect of the invention, a device for axially moving a gearbox element comprises a gear shift drum mounted rotatably about an axis of rotation and having a shifting groove formed circumferentially about the axis of rotation in its outer casing, which shifting groove is axially inclined at least in certain areas, a cage holding the gear shift drum and having a cage wall delimiting an inner cage space from an outer cage space and a wall slot extending axially through the cage wall, which opens the inner cage space to the outer cage space, a carriage held between the gear shift drum and the cage wall in the area of the wall slot so as to be axially movable, and a shift fork with two fork legs between which the gearbox element can be received in a form-fitting manner for axial movement in the axial direction, and a guidance pin connected to the fork legs which is inserted into the shifting groove guided by the wall slot and the carriage. According to the invention, the shifting groove is moulded into the gear shift drum with a closed curve.

The device is based on the consideration that the shift fork should move as free of play as possible in directions other than the axial direction. For this purpose, the shift forks in the aforementioned device are mounted on shafts via guiding sleeves, which are designed to take up installation space in the axial direction.

The specified device takes a different approach and does not mount the shift fork on its own shaft but guides it between the gear shift drum itself and a cage in which the gear shift drum is held. In this way, the specified device can be designed to be very space-saving, even if the gear shift drum guides a larger number of shift forks of, for example, three or four.

In an embodiment of the specified device, the shifting groove is elliptically formed in the gear shift drum. In this way, an endless loop is created for the shifting groove, via which all shifting states of the specified device can be set by endless rotation of the gear shift drum.

In another embodiment of the specified device, the axial ends of the gear shift drum are guided through the cage to the outer cage space, wherein a drive shaft for rotating the gear shift drum can be introduced into at least one of the axial ends in a form-fitting manner in the circumferential direction about the axis of rotation. In this way, means for rotating the gear shift drum can be connected by simply plugging on axle elements.

In a particular embodiment of the specified device, the gear shift drum is held in the cage in the area of its axial ends in and against the axial direction in a form-fitting manner. In this way, an axial play of the gear shift drum is minimised so that the shifting states of the device can be precisely defined.

In yet another embodiment of the specified device, the cage is constructed from at least a first cage part and a second cage part which are separable in the axial direction. In this way, the cage can be constructed in a simple manner as a modular system, for example in the field of model making.

In an additional embodiment of the specified device, the two cage parts are connected to each other by means of a cage form fit acting in the axial direction. In this way, the cage parts can be disassembled and reused, for example, in the field of model making for alternative models.

In a preferred embodiment of the specified device, the cage form fit comprises catch hooks. In this way, the aforementioned disassembly is achieved on the one hand, but also a secure cohesion of the two cage parts on the other hand.

In a further embodiment of the specified device, the carriage is guided in the slot in the axial direction with a carriage form fit acting in the circumferential direction about the axis of rotation. The purpose of this slot is to further increase the axial guiding effect, i.e. the guiding in the axial direction, and to prevent other degrees of freedom.

In a still further embodiment of the specified device, the carriage has, on its side facing the gear shift drum, a recess which is circular-segmented in cross-section and into which the gear shift drum is inserted. This circular-segmented recess prevents movements of the carriage transverse to the axial direction to be guided and further increases the axial guiding effect.

In a particularly preferred embodiment of the specified device, the carriage is held guided in the axial direction in the cage at its left and right ends as seen in the axial direction. In this way, the axial guiding effect is increased even further.

BRIEF DESCRIPTION OF THE DRAWINGS

The above-described properties, features and advantages of this invention, as well as the manner in which they are achieved, will become clearer in connection with the following description of the embodiments, which are explained in more detail in connection with the drawing, in which.

| List of reference signs | |
|---|---|
| 2 | Longitudinal direction |
| 4 | Transverse direction |
| 6 | Vertical direction |
| 8 | Axis of rotation |

List of reference signs

| | |
|---|---|
| 10 | Device |
| 12 | Gearbox element |
| 14 | Gear drive |
| 16 | Gearwheel |
| 17 | Circumferential direction |
| 18 | Shaft |
| 20 | Form-fit element |
| 22 | Ring |
| 24 | Slot |
| 26 | Coupling element |
| 28 | Wall |
| 30 | Cage |
| 32 | Top surface |
| 34 | Casing |
| 36 | Cage part |
| 38 | Cage part |
| 40 | Slot |
| 42 | Carriage |
| 44 | Insertion opening |
| 46 | Shift fork |
| 48 | Inner cage space |
| 50 | Gear shift drum |
| 51 | Shift drum opening |
| 52 | Insertion opening |
| 54 | Linear direction of movement |
| 56 | Direction of insertion |
| 58 | Shift drum body |
| 60 | Shift drum pin |
| 61 | Shift drum shoulder |
| 62 | Shifting groove |
| 64 | Angle of inclination |
| 66 | Supporting surface |
| 68 | Carriage form fit element |
| 70 | Carriage guiding element |
| 72 | Protrusion |
| 74 | Support shoulder |
| 76 | Support element |
| 78 | Guidance pin |
| 80 | Fork leg |
| 82 | Catch hook |
| 84 | Chamfer |

DETAILED DESCRIPTION

In the figures, the same technical elements are provided with the same reference signs, and are only described once. The figures are purely schematic and, in particular, do not reflect the actual geometric proportions. The description is given in a space spanned by a longitudinal direction 2, a transverse direction 4 transverse to the longitudinal direction 2 and a height direction 6 transverse to the longitudinal direction 2 and transverse to the transverse direction 4.

Figure 1:
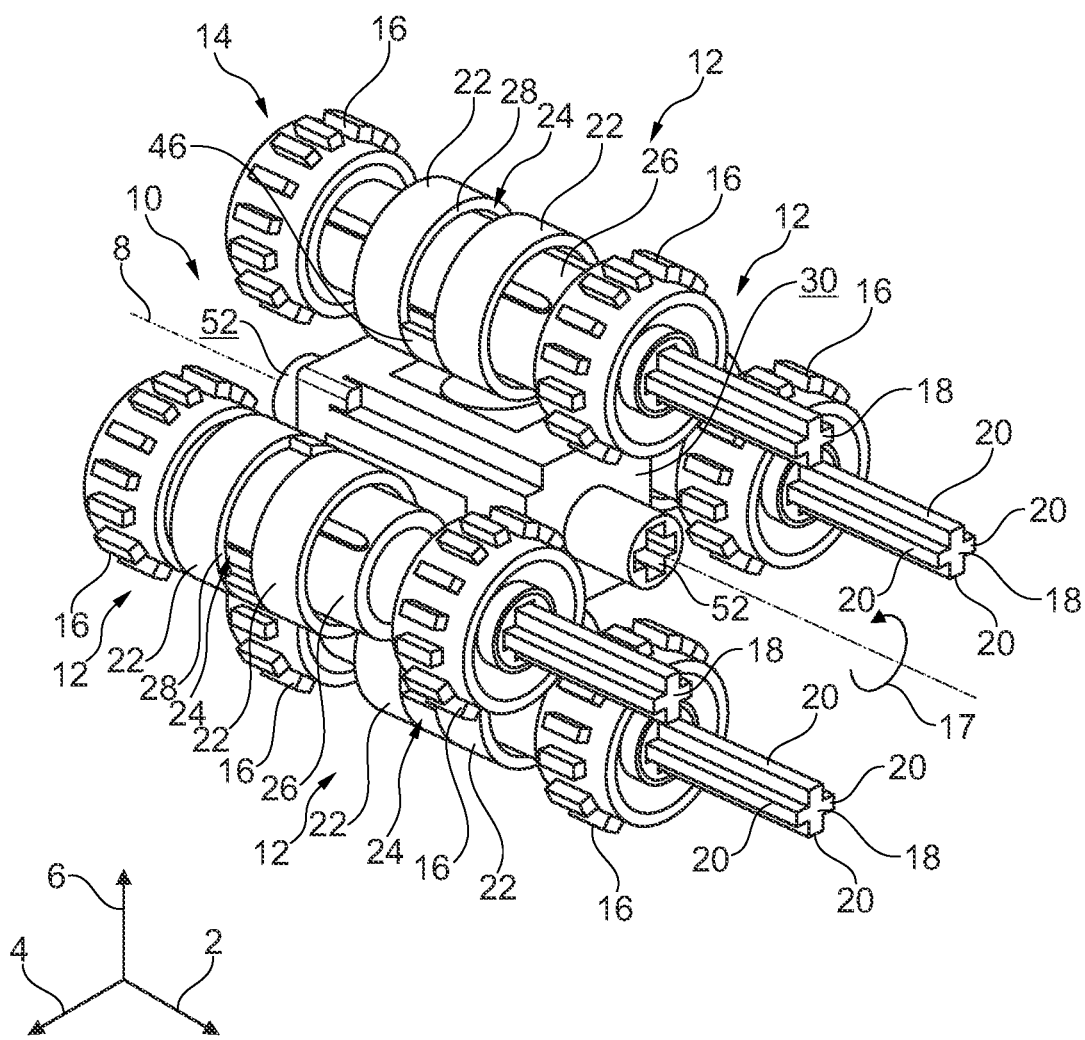
FIG. 1 is a perspective view of a device engaged with four gearbox elements.

Reference is made to FIG. 1, which shows a perspective view of a device 10 aligned parallel to an axis of rotation 8. The axis of rotation 8 runs parallel to the longitudinal direction 2.

In FIG. 1, the device 10 is in engagement with four gearbox elements 12 of a superordinate gearbox in the form of a gear drive 14, only parts of which are shown.

The task of a gearbox, and thus also of the gear drive 14, is to change movement variables. In the present embodiment, the movement variables are changed by means of gearwheels 16 which are held on shafts 18 so as to be rotatable in a circumferential direction 17 about the axis of rotation 8. The shafts 18 have form-fit elements 20 acting in the circumferential direction 17 which, for the sake of clarity, are not provided with their own reference sign on all shafts 18 in FIG. 1. In contrast to the gearwheels 16, the gearbox elements 12 are held positively on these form-fit elements 20, so that the gearbox elements 12 can move in the longitudinal direction 2 and thus in the direction of the axis of rotation 8, but cannot rotate in the circumferential direction 17.

Each gearbox element 12 is constructed from two rings 22 arranged parallel to the axis of rotation 8 and held axially spaced apart from each other and concentric with the respective shaft 18, so that an axial slot 24 is formed between the rings 22. The rings 22 of each gearbox element 12 are supported on coupling elements 26, which are arranged concentrically within the rings 22 and are secured to the rings 22 via walls 28. In each gearbox element 12, the respective coupling elements 26 are positively connected to the form-fit elements 20 of the respective shaft 18 so that the coupling elements 26 rotate with the rotation of the respective shaft 18. If the gearbox elements 12 are moved back and forth on the respective shafts 18 in the longitudinal direction 2, they can be positively engaged in the gearwheels in the circumferential direction 17, so that by rotating the respective shaft 18 not only the gearbox element 12 but also the engaged gearwheel is rotated.

The structure and the mode of operation of the gearbox elements 12 are basically known from WO 2019/137 993 A1 and shall therefore not be further elaborated.

Figure 2:
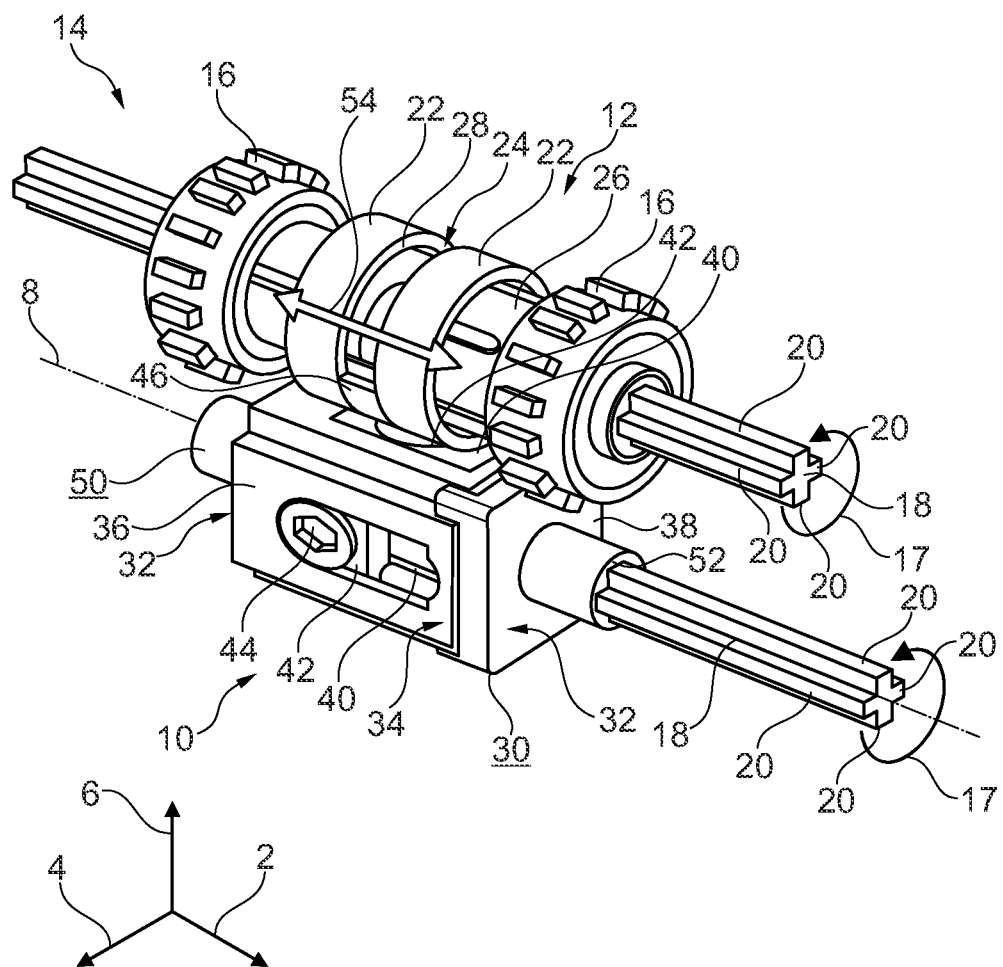
FIG. 2 is a perspective view of the device of FIG. 1 engaged with one gearbox element.

For further explanation of the device 10, reference is made to FIG. 2, which shows the device 10 in a perspective view with a single gearbox element in engagement.

The device 10 comprises a cage 30 of cylindrical construction with substantially square shaped top surfaces 32 and a casing 34 connecting the top surfaces. The top surfaces 32 are arranged perpendicular to the axis of rotation 8, the axis of rotation 8 passing centrally through the axis of rotation 8. The cage 30 is made of a first cage part 36 and a second cage part 38, the second cage part 38 being placed as a cover on the first cage part 36. The connection between the two cage parts 36, 38 will be discussed in more detail later.

Four slots 40 are formed through the casing 34, running parallel to the axis of rotation 8 and spaced 90° apart from each other as seen in the circumferential direction 17. In the perspective of FIG. 2, only two of the four slots 40 are visible. Each slot 40 holds a carriage 42 which is adapted to the shape of the respective slot 40 so that it is guided in the longitudinal direction 2. Each carriage 42 has a slot-shaped insertion opening 44 directed towards the axis of rotation 8, into which a shift fork 46 can be inserted. In the perspective and configuration of FIG. 1, only one of each of the slot-shaped insertion openings 44 and the insertable shift forks 46 can be seen.

The top surfaces 32 and the casing 34 of the cage 30 enclose an inner cage space 48 referenced later in FIG. 4, in which a gear shift drum 50 rotatable about the axis of rotation 8 is accommodated. The gear shift drum 50 is guided out of the inner cage space 48 through shift drum openings 51 in the top surfaces 32 of the cage 30, which can be seen in FIG. 4, and has a cross-shaped insertion opening 52 at each end, into each of which a shaft 18 can be inserted, as already described above. In the perspective of FIG. 2, only one of the cross-shaped insertion openings 52 can be seen, and only one of the cross-shaped insertion openings 52 has a shaft 18 inserted into it. Further construction details of the gear shift drum 50 will be discussed in detail later.

The gear shift drum 50 can be rotated in and against the circumferential direction 17 via the shafts 18 which can be inserted into the cross-shaped insertion openings 52. The task of the gear shift drum is to convert this rotary movement into a linear movement 54 of the carriages 42, which move the shift forks 46 with the linear movement 54. The shift forks 46, in turn, are positively inserted into the axial slots 24 of the gearbox elements 12 in the longitudinal direction 2 and can thus transmit the linear movement 54 to the gearbox elements 12. In this way, the gear drive 14 can be shifted in the manner explained further above.

Figure 3:
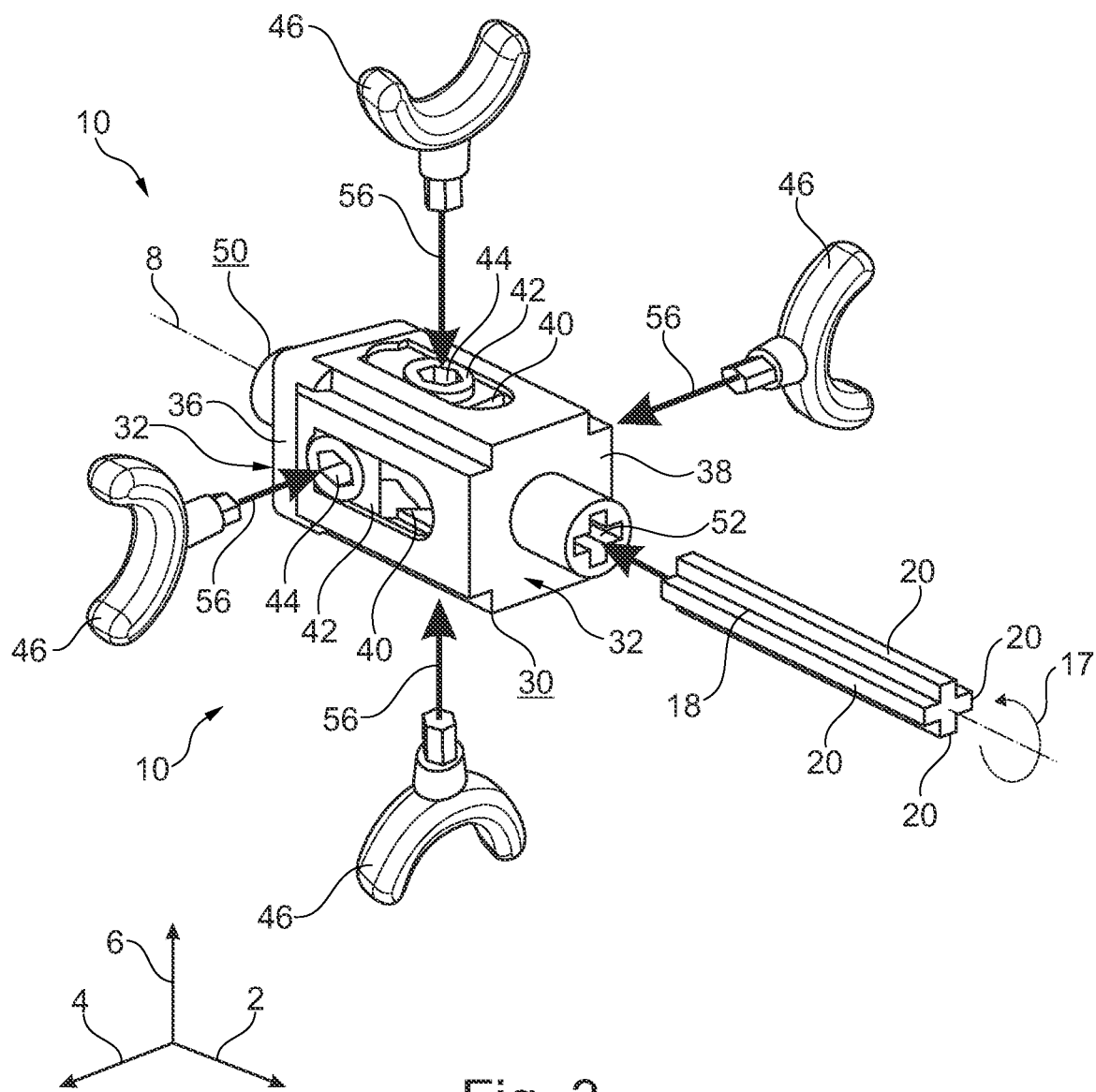
FIG. 3 is a partial perspective exploded view of the device of FIG. 1.

The device 10 makes it possible to construct the gear drive 14 in a modular manner with any number of gearwheels 16 between one and eight. This will be illustrated by FIG. 3, which shows a partial perspective exploded view of the device 10 of FIG. 1.

A shift fork 46 can be received in each slot-shaped insertion opening 44 in a corresponding insertion direction 56 directed towards the axis of rotation 8, so that the device 10 guides up to four shift forks 46. Each received shift fork 46 can then in turn engage a gearbox element 12 previously described in connection with FIG. 2, and thus shift either one gearwheel 16 or two gearwheels 16, depending on how many gearwheels 16 are arranged on the respective shaft 18. Thus, between one and eight shift stages can be constructed in any manner using the device 10.

Figure 4:
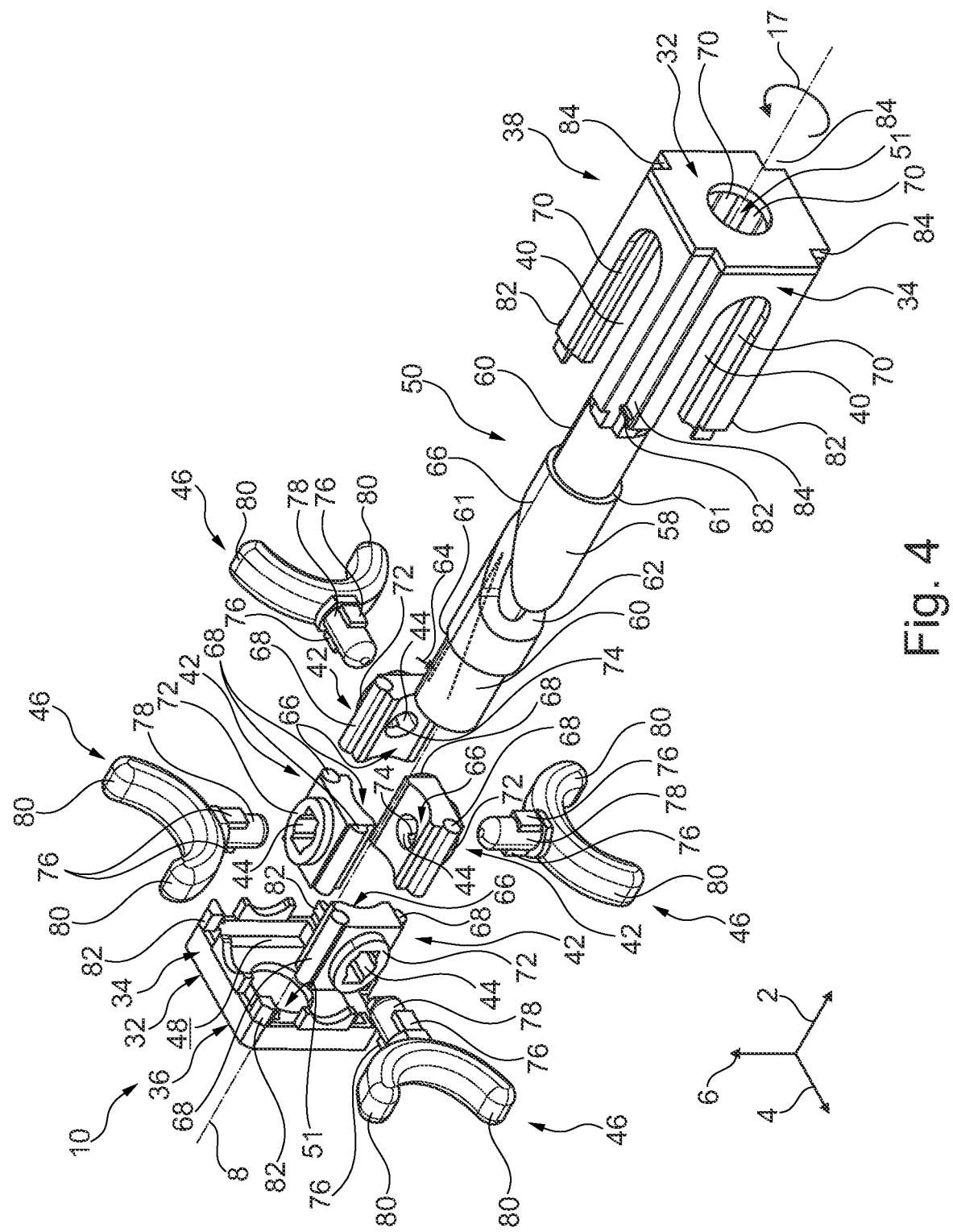
FIG. 4 is a full perspective exploded view of the device of FIG. 1.

For further explanation of the device 10, reference is made to FIG. 4, which shows a full perspective exploded view of the device 10.

The gear shift drum 50 is the core of the device 10. It has a shift drum body 58 laid rotationally symmetrically about the axis of rotation 8, to the end faces of which are connected shift drum pins 60 laid rotationally symmetrically about the axis of rotation 8. The insertion openings 52, which are not visible in the perspective of FIG. 4, are moulded into the axial end faces of these shift drum pins 60, which are opposite the shift drum body 58. Seen from the axis of rotation 8, the shift drum pins 60 have a smaller radius than the shift drum body 58, so that a shift drum shoulder 61 is formed at each of the axial ends of the shift drum body 58. The shift drum shoulders 61 can abut the shift drum openings 51 of the cage 30 for an axial form fit.

The shift drum body 58 has a casing, not further referenced, in which a shifting groove 62 is moulded. In order to be able to move a shift fork 46 axially by rotating the gear shift drum 50 about the axis of rotation 8, the shifting groove 62 must be laid in the area of the fork to be shifted so as to extend circumferentially about the axis of rotation 8 and be designed so as to extend with an angle of inclination 64 of greater than 0° and less than 90°. Individual shifting grooves 62 can be formed in the shift drum body 58 for moving each shift fork 46 individually. The common shifting groove 62 shown in FIG. 4 is merely a preferred example of an embodiment. Furthermore, the shifting groove 62 may be open in a manner not shown, with a beginning not shown and an end not shown formed into the shift drum body 58, for example in a spiral shape. The closed design of the shifting groove 62 shown in FIG. 4 with a basically elliptical course is merely a preferred example of an embodiment. However, this has the decisive advantage that the shifting groove can be produced without undercuts and can be separated into an upper shifting groove part and a lower shifting groove part at a dividing line in the form of supporting surfaces 66 indicated in FIG. 4, where two injection moulds can be brought together.

The cage 30 constructed from the two cage parts 36, 38 holds the gear shift drum 50 on the shift drum pins 60 in the shift drum openings 51 in the inner cage space 48, which has already been explained in connection with FIGS. 1 and 2. In this way, a guide space not further referenced is created between the gear shift drum and the casing surface 34 of the cage 30, in which the carriages 42 can be guided axially in and against the longitudinal direction 2. For this purpose, each carriage 42 has on its underside, viewed from the axis of rotation 8, a supporting surface 66 which is formed in a circular-segmented shape in a cross-section extending at right angles to the axis of rotation 8 through the respective carriage 42. The circular segment has a radius equal to the radius of the shift drum body 58. In this way, the carriage is guided on the shift drum body 58 with as little tolerance as possible.

Furthermore, each carriage 42 optionally has on each of its sides viewed in the circumferential direction 17 a carriage form fit element 68, which in the embodiment of FIG. 4 is designed as a semicircular rod and is held on the carriage base body, which is not further referenced. For guiding the carriage form fit elements 68, the cage 30 has corresponding carriage guiding elements 70 into which the carriage form fit elements 68 can be inserted so that the carriage can be guided back and forth in the longitudinal direction 2. Not all of these carriage guiding elements 70 existing in the cage 30 can be seen in the perspective of FIG. 4.

To further improve the guidance of the carriages 42 in and against the longitudinal direction, protrusions 72 can be formed on the carriages 42 which can be inserted in a positive-locking manner into the slots 40 in and against the circumferential direction 17. The protrusions 72 should be circular or elliptical in shape, at least in the area of contact with the walls of their respective slot 40, to minimise contact friction.

The slot-shaped insertion openings 44 through the carriages 42 change in their cross-section and thus have support shoulders 74, of which only two can be seen in the perspective of FIG. 4. Support elements 76 held on the shift forks 46 can be placed on these support shoulders 74, between which a guidance pin 78 is held in each shift fork 46. Two fork legs 80 are connected to each guidance pin 78.

For assembling the cage 30, the two cage parts 36, 38 each have four catch hooks 82, each with a hook form fit surface not further referenced, facing the top surface 32 of the respective cage part 36, 38. In this respect, on the second cage part 38, the catch hooks 82 are each held in a chamfer 84 which extends in the longitudinal direction 2 over the entire length of the second cage part 38. The chamfers 84 open the hook form fit surfaces of the catch hooks 82 on the second cage part 38 in the longitudinal direction, so that the second cage part 38 together with the catch hooks 82 can be manufactured without slides using a primary moulding process such as injection moulding.

To assemble the device 10 from the individual parts shown in FIG. 4, the carriages 42 are first inserted with their carriage form fit elements 68 into the carriage guiding elements 70 on the second cage part 38. Subsequently, the shift drum body 58 is inserted into the passage formed by the supporting surfaces 66 of the carriages 42 with one of the shift drum pins 60 in front, whereby the inserted shift drum pin 60 is guided outwards through the shift drum opening 51 on the second cage part 38. Finally, the first cage part 36 is placed on the second cage part 38 in the longitudinal direction 2 and the catch hooks 82 are hooked together. Now the shift forks 46 can be inserted with their guidance pins 78 into the slot-shaped insertion openings 44. Care must be taken that each inserted guidance pin 78 ends in the shifting groove 62 in order to ensure the abovementioned shifting function.

The invention claimed is:

1. A device (10) for axially moving a gearbox element (12), comprising:
　　a gear shift drum (50) mounted rotatably about an axis of rotation (8) and having a shifting groove (62) formed in its outer casing at least partially circumferentially about the axis of rotation (8), which groove is axially inclined (64) at least in some areas,
- a cage (30) holding the gear shift drum (50) with a cage wall (34) delimiting an inner cage space (48) against an outer cage space and a wall slot (70) extending axially through the cage wall (34) and opening the inner cage space (48) towards the outer cage space,
- a carriage (42) held axially movably between the gear shift drum (50) and the cage wall (34) in the area of the wall slot (70), and
- a shift fork (46) with two fork legs (80), between which the gearbox element (12) can be positively received for axial movement in the axial direction (2) and a guidance pin (78) which is connected to the fork legs (80) and is inserted into the shifting groove (62) guided through the wall slot (70) and the carriage (42),
- wherein the shifting groove (62) is molded into the gear shift drum (50) and the shifting groove (62) is elliptically formed in the gear shift drum (50) such that the shifting groove (62) is separated into an upper shifting groove part and a lower shifting groove part.

2. The device (10) according to claim 1, wherein the carriage (42) is guided in the slot (40) in the axial direction (2) with a carriage form fit acting in the circumferential direction (17) about the axis of rotation (8).

3. The device (10) according to claim 1, wherein the carriage (42) is held in the cage (30) guided (68, 70) in the axial direction (2) at its left and right ends as seen in the axial direction (2).

4. The device (10) according to claim 1, wherein the axial ends (60) of the gear shift drum (50) are guided through the cage (30) to the outer cage space, wherein a drive shaft (18) for rotating the gear shift drum (50) can be introduced into at least one of the axial ends (60) in a form-fitting manner (20) in the circumferential direction about the axis of rotation.

5. The device (10) according to claim 4, wherein the gear shift drum (50) is held in the cage (30) in a form-fitting manner (20) in the area of its axial ends in and against the axial direction (2).

6. The device (10) according to claim 4, wherein the shifting groove (62) is elliptically formed in the gear shift drum (50).

7. The device (10) according to claim 1, wherein the cage (30) is constructed from at least a first cage part (36) and a second cage part (38) which are separable in the axial direction (2).

8. The device (10) according to claim 7, wherein the two cage parts (36, 38) are connected to one another with a cage form fit (82) in the axial direction (2).

9. The device (10) according to claim 8, wherein the cage form fit comprises catch hooks (82).

10. The device (10) according to claim 7, wherein the shifting groove (62) is elliptically formed in the gear shift drum (50).

11. The device (10) according to claim 10, wherein the axial ends (60) of the gear shift drum (50) are guided through the cage (30) to the outer cage space, wherein a drive shaft (18) for rotating the gear shift drum (50) can be introduced into at least one of the axial ends (60) in a form-fitting manner (20) in the circumferential direction about the axis of rotation.

12. The device (10) according to claim 11, wherein the gear shift drum (50) is held in the cage (30) in a form-fitting manner (20) in the area of its axial ends in and against the axial direction (2).

* * * * *